United States Patent [19]

Richgels et al.

[11] Patent Number: 5,050,146
[45] Date of Patent: Sep. 17, 1991

[54] TRACK SEEK RECOVERY SYSTEM AND METHOD

[75] Inventors: Jerome F. Richgels, San Jose; John C. Kuklewicz, Sunnyvale, both of Calif.

[73] Assignee: Literal Corporation, Colorado Springs, Colo.

[21] Appl. No.: 387,910

[22] Filed: Jul. 31, 1989

[51] Int. Cl.[5] .............................................. G11B 7/085
[52] U.S. Cl. .................................. 369/32; 369/44.28; 369/54; 360/78.06
[58] Field of Search ......................... 360/78.04–78.08, 360/78.11; 369/32, 33, 43, 44.25–44.26, 44.28–44.29, 44.35, 54, 55, 58, 219–221

[56] References Cited

U.S. PATENT DOCUMENTS

| | | | |
|---|---|---|---|
| 4,544,968 | 10/1985 | Anderson et al. | 360/78.06 |
| 4,547,822 | 10/1985 | Brown | 360/78.06 |
| 4,592,035 | 5/1986 | Miyasho | 369/32 |
| 4,931,889 | 6/1990 | Osafune | 360/78.04 X |
| 4,955,011 | 9/1990 | Baba | 369/32 X |

Primary Examiner—Roy N. Envall, Jr.
Assistant Examiner—W. R. Young
Attorney, Agent, or Firm—Kinney & Lange

[57] ABSTRACT

At the conclusion of a track seek operation, handoff to track following servo control is delayed for a short time period during which the drive microprocessor determines if the head has failed to stop at the target track by sensing the occurrence of a predetermined number of track crossing pulses, the detection of which causes iterative generation and application of braking current pulses to the head actuator motor. The amplitude and duration of each braking current pulse is chosen to cause forward motion of the head to be retarded to a predetermined percent of its pre-existing velocity. The microprocessor routine includes provision for iteratively determining when the head has slowed to a velocity which allows the track following servo to acquire control of the head. Once stopped on a track, a short seek is executed to return the head to the desired target track. Provision is also made in the microprocessor routine to iteratively determine direction of head movement to complement the polarity of the braking current pulse in the event a previous pulse has reversed the direction of head movement thus assuring that the braking current pulses always result in retarding forward motion of the head.

12 Claims, 6 Drawing Sheets

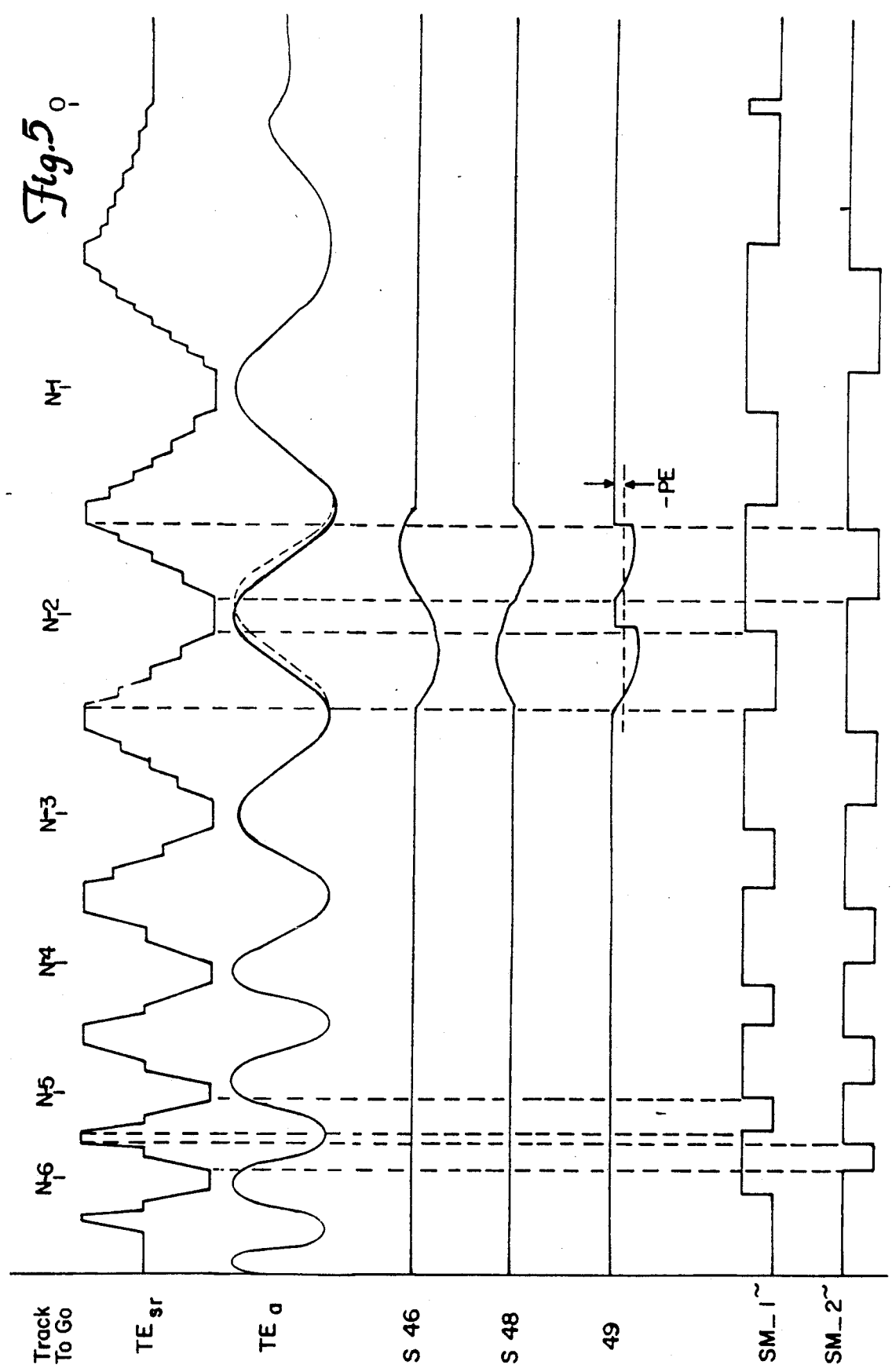

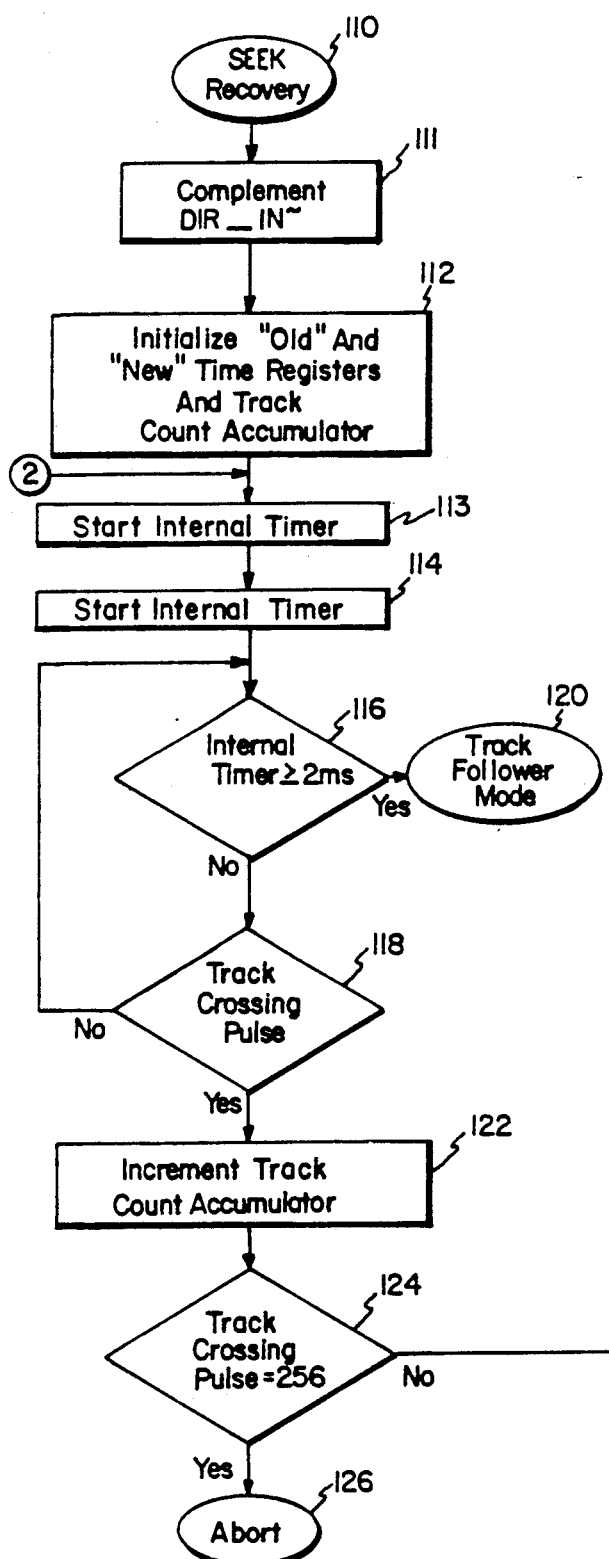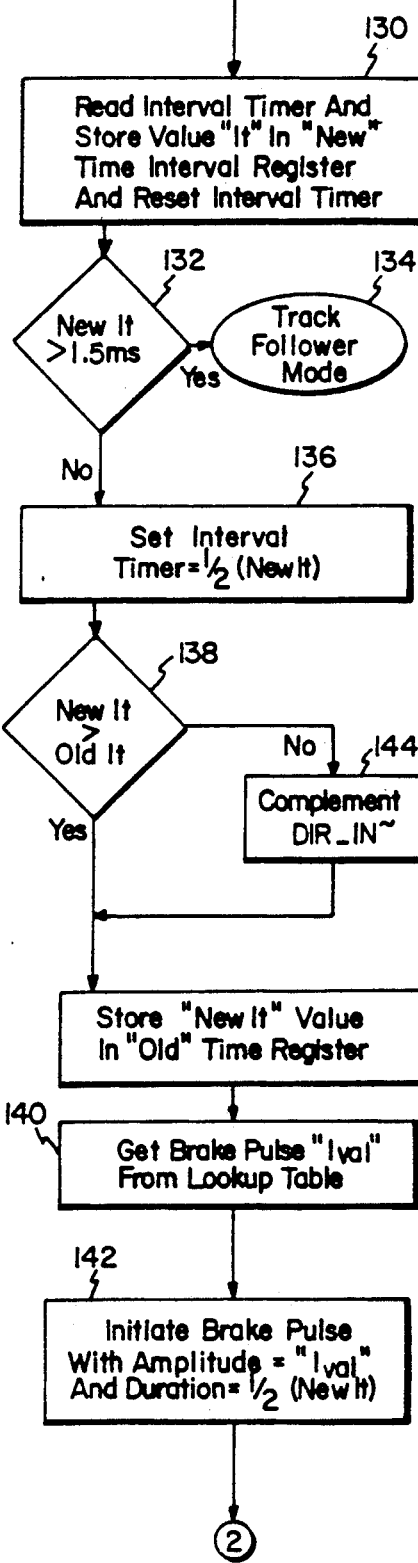
Fig. 7

TRACK SEEK RECOVERY SYSTEM AND METHOD

FIELD OF THE INVENTION

The present invention relates to random access information storage disk drive systems. More particularly, it relates to a read/write head positioning system and method for recovering from overshoot of the read/write head beyond the target track at the end of a track seek operation.

BACKGROUND OF THE INVENTION

In random access information storage systems, a read/write head must be moved periodically and reliably in track seek operations between spaced apart data tracks on the storage disk to access desired information sectors randomly located on the disk tracks. Various servo control systems are known for controlling the acceleration and deceleration of the head during the track seek operation. Ideally, movement of the head is controlled in such a manner that it arrives over the target track at the end of track seek with zero velocity. At this time, control over movement of the head is handed off from the track seek servo control circuit to the track follower servo control circuit to maintain the track sensor located in the head centered on the desired track during read or write operation.

It is well known to use dedicated servo control signals recorded on a servo disk or on the data disk to provide clean feedback control signals for reliable, continuous feedback servo control of head movement during seek operation. However, with ever increasing disk storage capacities, such as the case with optical and magneto-optical systems, servo control requirements become more stringent and dedicated servo control signals are no longer feasible in most cases. Thus feedback control is derived from tracking error signals generated by the track sensor from transitions between grooves and lands formed on the disk surface. Generally speaking, tracking error signals of this type are of much poorer quality than tracking error signals derived from dedicated servo control signals. In such situations, continuous feedback control is no longer feasible and sampling systems are used that make control of head movement less reliable, particularly when approaching the target track at the end of the track seek operation. One consequence is that the read/write head, on occasion, may arrive at the target track with a non-zero velocity and, in particular, a velocity that is too high for the track follower servo circuit to effectively take over the positioning control of the head to hold the head on the target track. If this occurs, the head will continue to move beyond the target track until stopped, either at the extreme inward or outward travel of the head or by some mechanism that recognizes the out-of-control condition and brings the head to a halt before it reaches its extreme travel boundary. Once stopped, the new track location can be read and an appropriate return seek executed in known manner to move the head back to the target track.

It is therefore an object of the present invention to provide a system and method for detecting overshoot of a read/write head beyond the target track at the end of a track seek operation and for bringing the head motion to a low enough velocity that will allow effective acquisition of track follower servo control of head positioning.

SUMMARY OF THE INVENTION

Therefore, in accordance with the invention, there is provided head motion control system for an information storage disk drive apparatus which comprises means for generating track crossing signals as the read/write head moves across data tracks formed on the information storage disk and means, including a head actuator motor, for executing a track seek operation adapted to result in arrival of the head over the target track with zero velocity at the end of the seek. The system of the invention further comprises means responsive to the track crossing signal generating means for sensing undesired, continued motion of the head past the target track and means responsive to the sensed continued motion for applying at least one braking pulse to the actuator motor adapted to slow the motion of the head by a predetermined amount.

BRIEF DESCRIPTION OF THE DRAWINGS

In the drawings:

FIG. 5 is a graph of signal waveforms at various points in the seek servo system of FIG. 1 which is useful in explaining the operation thereof.

FIG. 7 is a flow diagram of another segment of the track seek recovery program used by the microprocessor in the system of FIG. 1 which is operative to brake uncontrolled motion of the head when overshoot at the end of track seek is detected.

DETAILED DESCRIPTION

Figure 1:
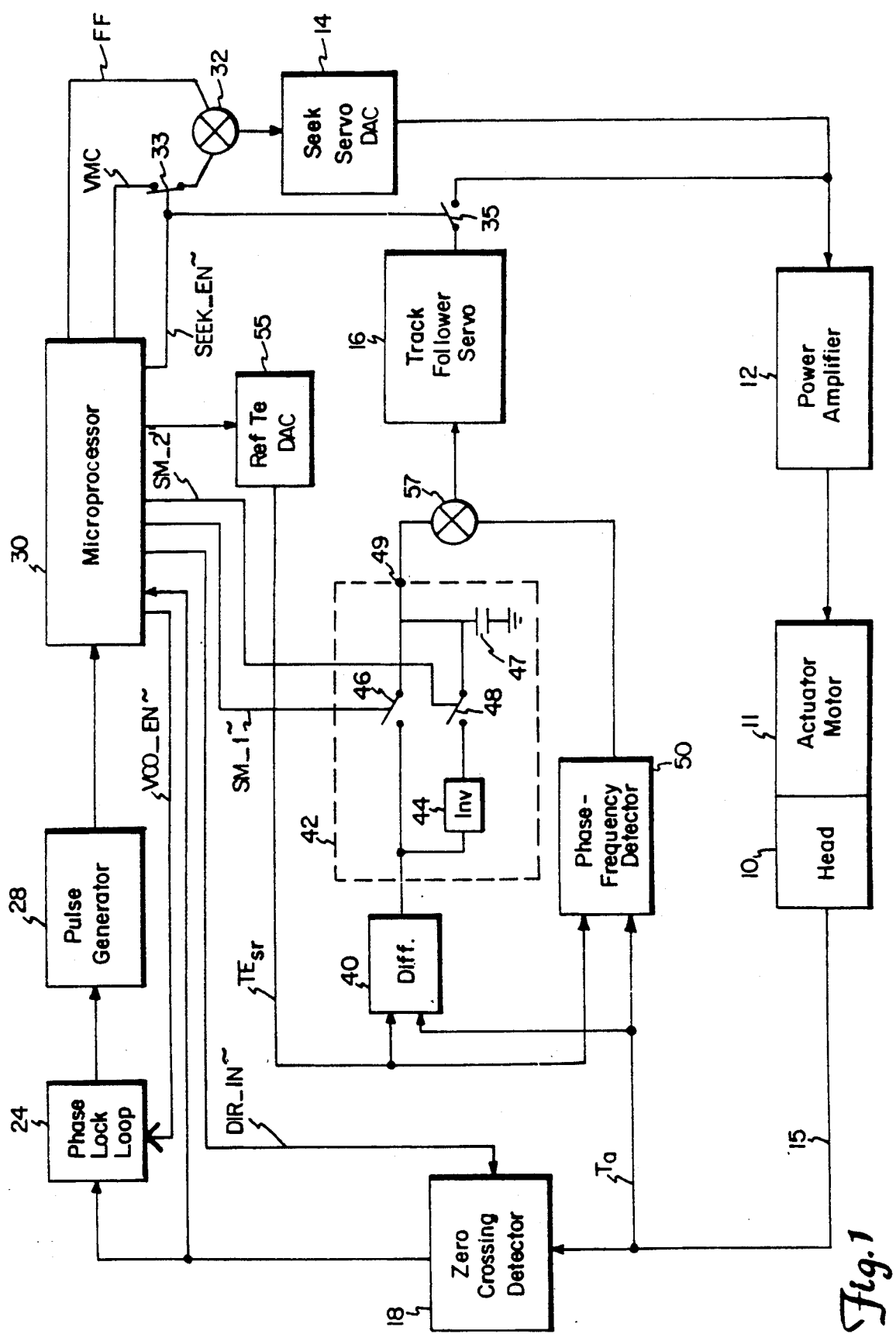
FIG. 1 is a partly schematic block diagram of a disk drive head positioning servo system embodying the track seek recovery system of the present invention.

Before describing in detail the track seek recovery system of the present invention it will be instructive to first consider, in connection with FIGS. 1-5, the structure and operation of a track seek system for an optical or magneto-optical disk drive system with which the recovery system of the present invention may advantageously be used. Accordingly, in FIG. 1, a disk drive head positioning servo control system is shown which includes an optical or magneto-optical head 10 coupled to actuator motor 11. Motor 11 operates to move head 10, as required, to position and hold a read or read/write optical beam on a desired data track of an information storage disk (not shown). The driving current for actuator motor 11 is provided by power amplifier 12 which derives its control input from seek servo digital-to-analog converter (DAC) 14 and tracking servo 16. The contribution of DAC 14 and/or servo 16 to the control of the positioning of head 10 depends on the function being performed at any given time, i.e. track seek or track following.

Included in head 10 is conventional sensing means for generating an actual tracking error signal well known manner from transitions between concentric data grooves and intermediate land areas on the storage disk, the tracking error signal being representative of actual movement of the head relative to the data tracks. This actual tracking error signal is coupled by line 15 to the input of zero crossing detector circuit 18 which is conditioned by a DIR_IN~logic control signal from microprocessor 30 during normal track seek operation according to the direction in which the seek is occurring to produce an output pulse each time the optical sensor in head 10 crosses a land between data tracks on the storage disk. The actual tracking error signal derived in head 10 is also applied to the inputs of a difference circuit 40 and a phase-frequency detector circuit 50 for reasons which will be discussed later.

The pulse train output of zero crossing detector 18 may have gaps in the train resulting from corruption of the actual tracking error signal caused by disk surface imperfections or the head passing over mirror areas on the disk which temporarily prevents the tracking error signal sensor in the head from reliably indicating true transitions between data grooves and land areas. To compensate for this, the output pulse train from detector 18 is applied to the input of a phase lock loop circuit 24 which is enabled during track seek by logic VCO_ EN~from microprocessor 30 to generate a sawtooth ramp function at a frequency which is locked in phase with the fundamental frequency of the pulse train from zero crossing detector 18. The output of PLL 24 is applied to pulse generator 28 which converts the sawtooth ramp function signal to a train of pulses representative of land crossings comprising a reference tracking error signal which is then coupled to the drive controller microprocessor 30. As is well known in electronic servo control systems, PLL 24 functions in the nature of an electronic flywheel to continue the production of land crossing output pulses in generator 28 even when input pulses to PLL 24 are temporarily missing from the output of zero crossing detector 18. The pulse train from generator 28 is applied to microprocessor 30 to control an event counter and an interval timer in a manner to be described.

Figure 2:
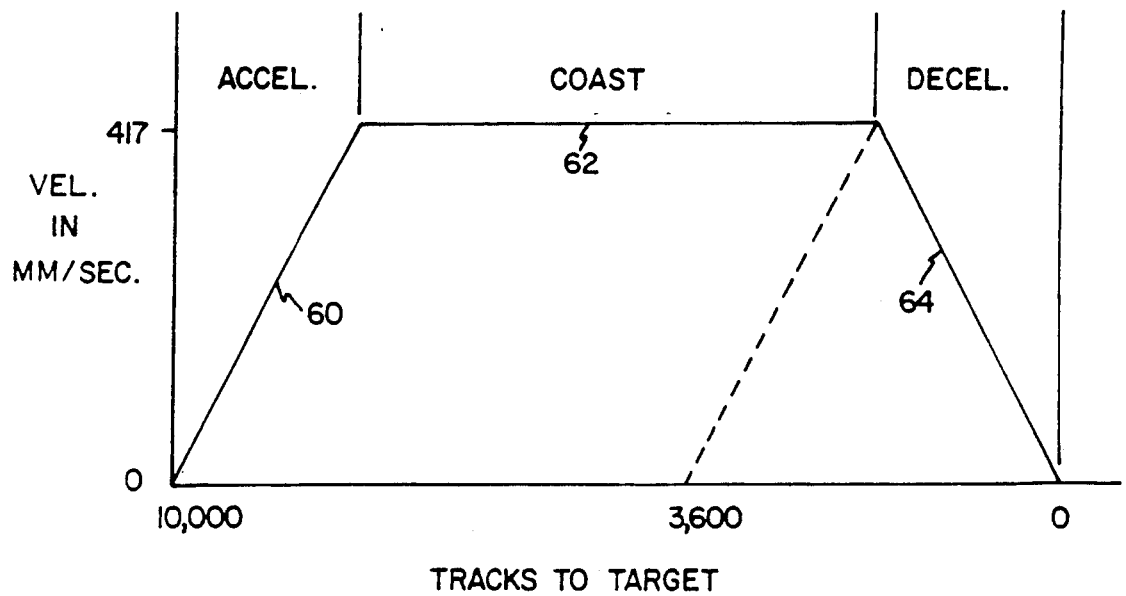
FIG. 2 is a graph illustrating a typical velocity seek profile useful in explaining the seek operation of the FIG. 1 system.

As needed during seek operations, feed forward (FF) head acceleration and deceleration digital drive values are generated in microprocessor 30 and applied via combining circuit 32 to seek servo DAC 14 where they are converted to analog voltage signals for application to the input of power amplifier 12 to generate predetermined acceleration and deceleration drive currents for actuator motor 11. In an actually constructed embodiment, acceleration and deceleration values of +3g and −3g are used although it will be appreciated that the values are a matter of known choice dependent on the drive system parameters. A digital velocity mode seek (VMS) error value is generated in microprocessor 30 in response to feedback information in the reference tracking error pulse train from generator 28. This VMS error value is applied via solid state switch 33 to another input of combining circuit 32 to modify the feed forward acceleration value, as needed, to maintain the velocity of head 10 during velocity mode seek within a desired range to conform to a predetermined velocity profile stored in microprocessor 30, an example of which is illustrated in FIG. 2. The resultant output value from combining circuit 32 is converted in DAC 14 to an analog voltage used to generate the desired driving current in power amplifier 12 for use by actuator motor 11 in controlling the movement of head 10. Control signals SEEK_EN~and VCO_EN~generated at appropriate times in microprocessor 30 are applied, respectively, to a solid state switch 33 and to a voltage controlled oscillator in PLL 24 to enable operation of the velocity mode feedback loop as just described and to disable the velocity mode loop when the seek servo switches to the position mode seek as the head approaches the target track at the end of the seek operation.

As thus far described, the seek servo system of FIG. 1 is operative during long track seeks of, for example, 256 tracks or more, to move head 10 rapidly across the data tracks at different velocities generally following the exemplary velocity profile illustrated in FIG. 2. As is typical in track seek operations, the seek velocity profile is initiated with a constant acceleration phase corresponding to linearly increasing velocity segment 60 and ends with a constant negative acceleration (deceleration) phase corresponding to linearly decreasing velocity segment 64. For seeks greater than some intermediate number, such as 3600 tracks, the acceleration drive current is reduced to zero when the head reaches a predetermined terminal velocity, e.g. 417 mm/sec, and the head is allowed to coast with a generally constant velocity during this coast phase as represented by segment 62 of the FIG. 2 profile. The acceleration and deceleration drive currents used to achieve the linearly increasing and decreasing velocity profiles of segments 60 and 64 are determined by the aforementioned feed forward (FF) values generated in microprocessor 30.

In order to provide a degree of control over the drive of head 10 to assure that it is following the desired velocity profile, at least within an acceptable range of deviation, the servo loop comprised of zero crossing detector 18, PLL 24, pulse generator 28, microprocessor 30 and seek servo DAC 14, employs a pseudo-sampled form of velocity feedback, meaning that the actual velocity information derived in microprocessor 30 from the reference tracking error signal at the output of pulse generator 28 is not continuous. As previously mentioned, it may not be feasible to use continuous velocity feedback control in the system of the type described due to the generally poor quality of the actual tracking error signal from head 10. With this pseudo-sampled velocity feedback, actual velocity is determined by measuring the time interval between track crossings while the head is moving across the disk surface, as represented by the period between pulses from pulse generator 28.

Figure 3:
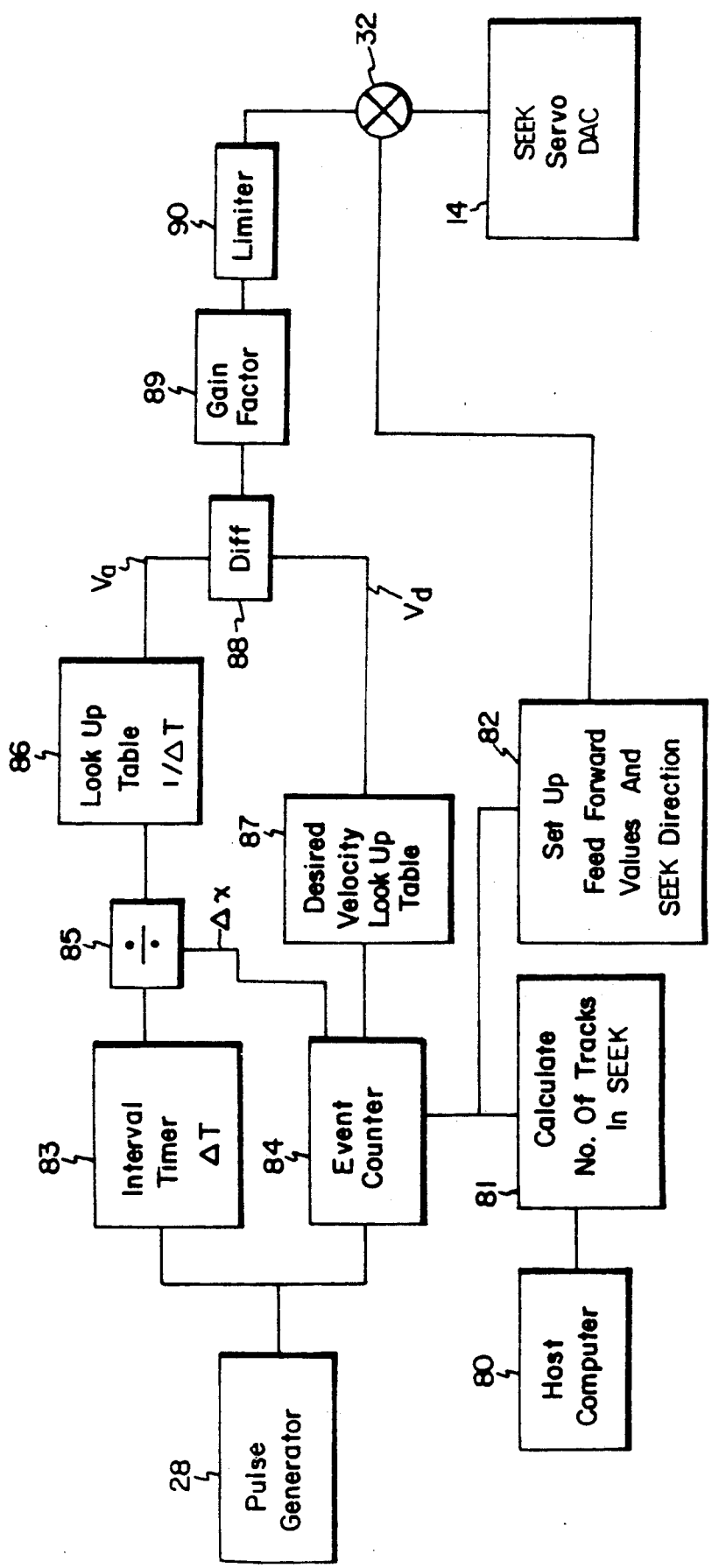
FIG. 3 is a schematic representation of the algorithm performed in the microprocessor of the seek servo system of the FIG. 1 system.

Referring to FIG. 3, there is shown in schematic form the algorithm performed in microprocessor 30 for developing the pseudo-sampled velocity feedback information. In a typical seek operation, the desired target track address supplied from the host computer 80 is used at 81 to calculate the difference between the current track and the target track to determine the number of tracks involved in the seek. The target track address is also used to determine the direction of the seek, i.e. radially inward or outward of the center of the disk which is represented by logic control signal DIR_IN~. With this information, the microprocessor sets up the acceleration and deceleration feed forward values which are stored in registers in the microprocessor before any head movement begins.

Due primarily to the fact that the phase lock loop circuit 24 requires a minimum number of input zero crossing pulses from detector 18 to phase lock onto the pulses, microprocessor 30 determines if the seek is greater than a predetermined minimum number of tracks, e.g. 256 tracks in an actually constructed embodiment, and, assuming it is, outputs the digital FF value of acceleration via combining circuit 32 to seek servo DAC 14 to start the head moving.

At the beginning of the seek, interval timer 83 is started and event counter 84 is enabled. Counter 84 has been initially loaded by 81 with a negative count corresponding to the number of tracks to go in the seek and, once enabled, is incremented each time a land crossing pulse is received from pulse generator 28. Consequently, event counter 84 keeps a running tally of the number of tracks left to go to the target track as the head moves across the disk surface. When the counter overflows (reaches a count of zero), the head has reached the target track.

At the beginning of each microprocessor sample, once the head movement has commenced, a land crossing pulse from pulse generator 28 causes interval timer 83 to be read, the reading stored away and the timer reset to 0 to begin timing for the next sample. At the same time, the incoming land crossing pulse from generator 28 causes the event counter 84 to be read and subtracted from the previous event counter value to get a $\Delta \chi$ value representing the number of tracks crossed since the last sample. The interval timer value $\Delta T$ is then divided at 53 by $\Delta \chi$ to get the time interval for one track crossing 1 $\Delta T$. This value is used to access the actual velocity lookup table 86 which returns a scaled value $V_a$ representing the sampled actual velocity of head 10.

The new difference value residing in event counter 84 representing the number of tracks to go to target is used to access the desired velocity lookup table 87 which returns a scaled value $V_d$ representing the desired velocity value for that particular difference to the target track. The lookup table used for this purpose may be conventionally generated by using the known square root switching curve:

$$V_d = \sqrt{2A(S_f - X_s)}$$

where:
$V_d$ = desired velocity
A = acceleration
$X_f$ = current track
$X_s$ = target track
X is in millimeters The actual velocity value from lookup table 86 is then subtracted at 88 from the desired velocity value from lookup table 82 to get the preliminary velocity error. The result is multiplied by a predetermined gain factor at 89. The magnitude of this velocity error value is clamped by the limiter 90, and is output to servo DAC 32 where the computed digital value is converted to an analog voltage for application to power amplifier 12 which, in turn, generates the corresponding driving current for actuator 11, all in known manner.

After all calculations are made, the operation of microprocessor 30 returns to the beginning of the velocity mode calculation loop and waits for the next land crossing pulse from pulse generator 28. This process iterates continuously until the end of the velocity mode and the beginning of what may be referred to as the "arrival phase" at which time the system switches to a position mode of operation. It may be noted with reference to FIG. 2 that the velocity mode profile is comprised of three phases of operation: (a) acceleration, (b) coast and (c) deceleration. Near the end of the deceleration phase, when the land crossing pulse for track n-6 is received, i.e. 6 tracks to go to target, the microprocessor 30 terminates velocity mode operation and switches to position mode operation for the arrival phase of the track seek operation.

Figure 4:
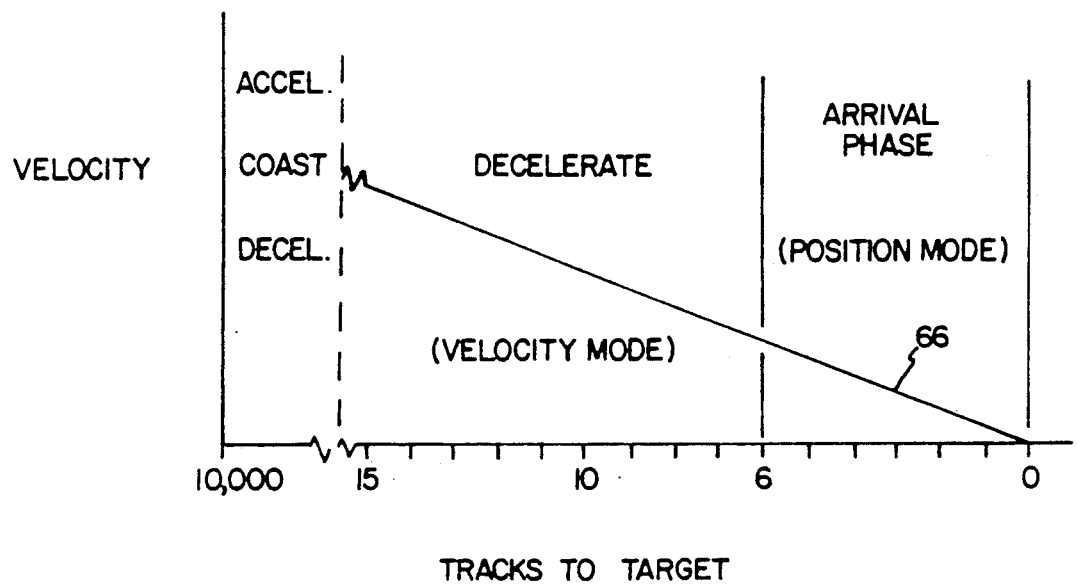
FIG. 4 is graph of a the arrival portion of the velocity seek profile of FIG. 2.

Referring again to FIG. 1. There will now be considered that portion of the drive servo control system which is effective to provide position mode seek control of head 10 during either the arrival phase at the end of a long seek, as illustrated in FIG. 4, or throughout the entirety of a short seek, i.e. a seek less than a predetermined number of tracks, e.g. 256 tracks in an actual embodiment. Thus for this purpose, the actual tracking error signal from head 10 is applied simultaneously to respective first inputs of difference circuit 40 and phase-frequency detector circuit 50. A reference tracking error signal, $TE_{sr}$ in FIG. 5, is synthesized from digital values generated in microprocessor 30 and converted to an analog signal by reference tracking error DAC 55. The synthesized reference tracking error signal corresponds in frequency and phase to a tracking error signal which would be generated by tracking error sensing means in head 10 if head 10 were moving in a desired profile of position versus time across a predetermined number of tracks on the storage disk. Preferably the reference tracking error signal includes at least one segment of monotonically decreasing frequency representing a desired slowing of head movement across a contiguous series of tracks adjacent the target track at the end of a seek operation, as would be the case at the end of a long seek operation.

This reference tracking error signal is applied simultaneously to respective second inputs of difference circuit 40 and phase-frequency detector 50. The applied actual and synthetic reference tracking error signals are then differenced in circuit 40 and the resultant output applied to a synchronous demodulator 42 wherein there is generated a first position error signal representative of any deviation in actual position of head 10 from the desired position represented by the reference tracking error signal. In synchronous demodulator 42, the output of difference circuit 40 is applied directly to a solid state switch 46 and, in parallel, through an inverter circuit 44 to solid state switch 48. Timed switching signals SM—1-~and SM—2~are generated in microprocessor 30 and coupled to switches 46 and 48, respectively, to generate a dc error voltage with a polarity dependent on the direction of phase error between the actual and reference tracking error signals. Simultaneously, phase-frequency detector 50 is responsive to the reference and tracking error signals at its inputs to generate a second position error signal representative of deviation in actual position of head 10 from the desired position as represented by the reference tracking error signal. The outputs of synchronous demodulator 42 and phase-frequency detector 50 are combined in adder circuit 57 and coupled to the input of conventional tracking servo circuit 16 to provide a closed loop feedback which locks the moving position of head 10 to the desired position represented by the reference tracking error signal generated by microprocessor 30 and reference tracking error DAC 55.

For a short seek operation, e.g. less than 256 tracks, the operation of the seek servo system is the same as just described for the position mode operation during the arrival phase of a long seek, except that the reference tracking error signal corresponds in frequency and phase to the complete profile, similar to that of FIG. 2, of head acceleration and deceleration and an optional coast segment throughout the entire seek operation. Thus at the beginning of position mode seek, a positive acceleration feed forward drive current of appropriate polarity is applied via DAC 14 to amplifier 12 and actuator motor 11. At the same time, microprocessor 30 outputs a synthesized tracking error signal that corresponds to desired movement of the head 10 across the tracks at a linearly increasing velocity that would result from the applied positive acceleration current. In the illustrated embodiment, the synthesized reference tracking error signal begins with a swept burst at an increasing frequency of from 4 KHz to 12 KHz for a period of 6 tracks, the exact opposite of decreasing frequency burst $TE_{sr}$ in FIG. 5 employed in the aforedescribed arrival seek phase. At the end of the sixth track, and assuming the seek is greater than twelve tracks, the feed forward acceleration current is reduced to zero and the frequency of the synthesized reference tracking error signal is held constant at 12 Khz for the coast phase of the seek corresponding to a predetermined constant head velocity, e.g. 22 mm/sec. This continues until microprocessor 30 determines that track n-6 has been reached at which time the synthesized reference tracking error signal enters the arrival phase with a swept decreasing frequency exactly as described above in connection with the arrival phase of a long seek. Throughout the position mode seek, the actual tracking error signal is maintained locked to the reference tracking error signal (and thus also the movement of head 10) by the position mode feedback loop including synchronous demodulator 42 and phase-frequency detector 50. If the seek is fewer than 12 tracks, the coast phase is eliminated and a lower terminal frequency is reached by the reference tracking error signal at the seek midpoint, at which time the deceleration phase is initiated to bring head 10 to the target track at the desired zero velocity.

Having thus described the normal and desired operation of the tracking servo system, it will be appreciated that it is possible for the sensor head 10 to arrive at the target track with a positive velocity which can be high enough to be outside the bandwidth of the track follower servo circuit 16 and thereby preventing acquisition of control over the head by the track follower control circuit when the position mode seek control is terminated. Accordingly, there will now be described the position mode seek recovery system of the present invention which is adapted to detect this out-of-control event and to take necessary corrective action to bring the head under control. Essentially, the system and method for accomplishing this, once the condition is detected, is to apply one or more reverse polarity braking current pulses to the motor actuator 11 each of which is designed to slow the head down to a predetermined fraction, such as 30%, of its velocity existing just prior to application of each braking pulse.

Figure 6:
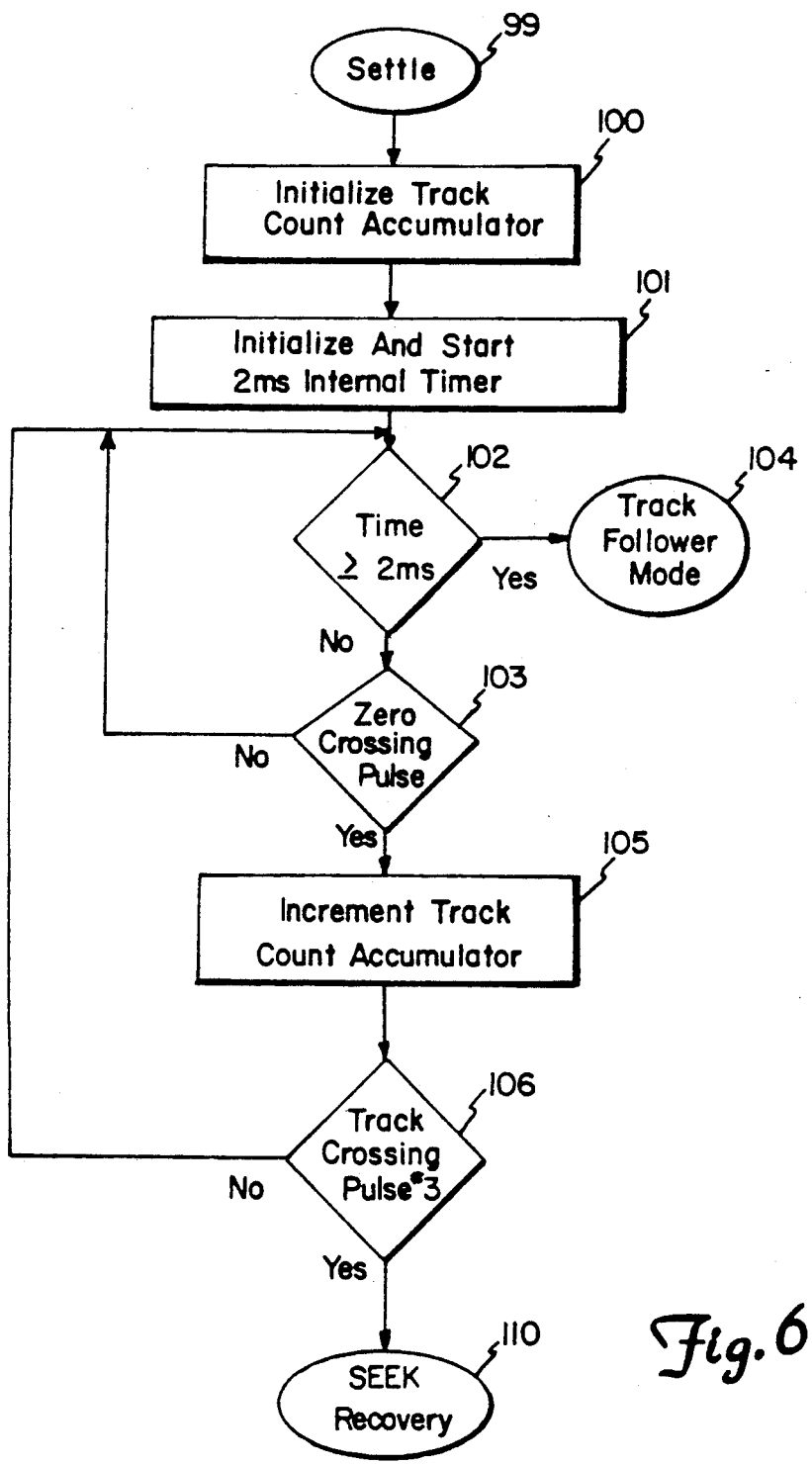
FIG. 6 is a flow diagram of the seek overshoot detection segment of the track seek recovery program used by the microprocessor in the system of FIG. 1 in accordance with a feature of the present invention.

To this end, at the conclusion of the track seek operation, the microprocessor nulls the reference tracking error signal from the reference TE DAC 55 and also terminates the −3g feed forward deceleration value to null the drive current from the servo DAC. At the same time, the microprocessor 30 enters a SETTLE routine, illustrated in the flow diagram of FIG. 6, the purpose of which is to determine if the head has stopped over the target track or at least is moving at a slow enough velocity to allow the track following servo circuit 16 to acquire control of the positioning of the head to maintain the head sensor in the center of either the target track or at least a track closely adjacent the target track. Referring to the flow diagram of FIG. 6, upon entering the SETTLE routine at 99, a track count accumulator and an internal timer are set to zero at 100 and 101 and the timer is started. The microprocessor then waits with sequential tests 102 and 103 for a track crossing pulse to be detected at the output of crossing detector 18. If no pulses are detected within a period of 2 milliseconds, the microprocessor enters the TRACK FOLLOWER MODE routine at 104 to cause track follower servo 16 to acquire control of head 10. If, however, a zero crossing pulse is detected within the 2 millisecond settling time period, the track count accumulator is incremented at 105 and the count tested at 106. If fewer than 3 pulses, the routine loops back to wait for the next pulse of the 2 millisecond timeout. If a third track crossing pulse is detected within the 2 millisecond settle period, it is assumed that a seek failure has occurred and that the head is moving out of control across the disk surface. When this occurs, the microprocessor proceeds to the SEEK RECOVERY routine at 107, the flow diagram for which is shown in FIG. 7.

Referring now to FIG. 7, upon entry into the SEEK RECOVERY routine, logic control signal DIR_IN⁻ is complemented at 111 even though the head is assumed to be moving in the same direction as the original seek so that pulses at the output of detector 18 now represent groove crossings rather than land crossings. This is done to facilitate acquisition track follower servo control at the appropriate time. It also results in the application of the proper polarity of brake current pulses to slow down the velocity of the head as will be seen later. Then, after initializing, at 112, "old" and "new" time registers and the track count accumulator, separate internal and interval timers are started at 113 and 114. Sequential tests 116 and 118 are then employed to again wait for the occurrence of track crossing pulses during a 2 millisecond period following the initial 2 millisecond SETTLE period. If no track crossing pulses are detected during this period, the routine exits to the TRACK FOLLOWING MODE routine at 120 when the 2 millisecond timeout occurs. Assuming a track crossing pulse is detected within the 2 millisecond period, the track count accumulator is incremented at 122 and the new count tested at 124 to see if 256 pulses have been detected. If so, the seek error recovery routine is aborted at 126 on the assumption that the routine should be successful under normal circumstances in this length of travel and, if not, the routine should be aborted to prevent physical damage to the system. The limit of 256 pulses is somewhat arbitrary and other values could be employed. If this limit has not been reached, the interval timer is read and the value "IT" is stored in a separate "new" time interval register and the interval timer is reset. This "new IT" value is then tested at 132 to see if the value is greater than 1.5 milliseconds and, if so, the routine exits to the TRACK FOLLOWING MODE routine at 134. The assumption at this point is that, with a time period of 1.5 milliseconds since the previously detected track crossing pulse, the head is actually moving slow enough to allow acquisition of control by the track following servo 16.

Assuming the time period is less than 1.5 milliseconds, however, the routine moves to instruction 136 which resets the interval timer to a value of ½("new IT"). This value will constitute the time duration of the ensuing braking pulses used to slow the head down from its uncontrolled movement. Test 138 then determines if the "new IT", i.e. the period between the most recent two track crossing pulses, numbers 2 and 3 in sequence, is greater than "old IT", i.e. the period between the previous pair of track crossing pulses numbers 1 and 2 in sequence. Instruction 139 then causes the "new IT" value to be stored in the "old IT" register. Assuming for the moment that test 138 finds the "new IT" is greater than "old IT", instruction 140 then obtains the value of the braking pulse current, "I$_{val}$", from a lookup table using the "new IT" value as the lookup variable. In accordance with a feature of the invention, the equation used to generate these current magnitude values in the lookup table is as follows:

$$I_{val} = \frac{0.707 \times MH \times TP}{0.5 \times IT^2 \times KF} \quad (1)$$

where:
MH = head mass
TP = track pitch
IT = new interval time
KF = motor force constant It will be appreciated that head mass includes any parts movable therewith including, for example, motor actuator coils attached to the head.

Once the brake current value "I$_{val}$" is acquired, instruction 142 applies this value to servo DAC 14 and executes the "½("new IT") timeout from the interval timer as established by instruction 136. This, in turn, causes the desired analog braking pulse current to be applied to actuator motor 11 via amplifier 12. Since the logic signal DIR_IN~ was complemented at the beginning of the routine, the polarity of the braking pulse is the reverse of the positive feedforward drive current that was used to during the original seek operation. As a consequence the brake pulse attempts momentarily to drive the head back. However, the values of I$_{val}$ in Eq. (1) are set cause only an underdamped slowing of the head to 30% of its existing velocity. Accordingly, the effect of this momentary opposite polarity pulse is analogous to physically hitting the head at its forward end with a hammer to cause the head to slow down. Although the parameters of the above equation for I$_{val}$ are chosen to cause the head to be slowed down to 30% of its immediately previous velocity, although it will be appreciated that other parameters might be employed. At the conclusion of the braking pulse, the SEEK RECOVERY routine loops back to instruction 112 and reinitiates the process of waiting for track crossing pulses in the 2 millisecond time period to determine whether the head has slowed to a velocity within which the track following servo can successfully acquire control and, if not, to initiate another braking current pulse to further slow the head down to a controllable velocity. Once track follower servo in able to acquire control of the head, microprocessor 30, in conjunction with the host controller can reinitiate a short seek to return the head to target track in the manner described above in connection with the seek servo operation.

Test 138 is optionally included as a safety precaution to determine if the head is speeding up or slowing down just prior to application of the braking pulse. On the first loop through the routine, the assumption is that the head is slowing down, albeit not under control, as a consequence of the just-concluded deceleration phase of the track seek operation. However, on subsequent loops through the routine, it is desirable to provide for the possibility that previous braking pulses, even though designed to provide an underdamped retarding action, have not in fact caused the head to reverse direction and begin accelerating. To counter this, test 138 effectively senses the acceleration and branches to instruction 144 to complement the DIR_IN~ control logic signal to reverse the polarity of the subsequent braking pulse thereby to again effect a slowing action on the head.

The invention has been described in detail with particular reference to a presently preferred embodiment, but it will be understood that variations and modifications can be effected within the spirit and scope of the invention.

What is claimed is:

1. Track seek recovery system for an information storage disk drive system adapted to move a head rapidly during a track seek operation to a target track at the end of the seek, the recovery system comprising:
    means for generating track crossing signals as said head moves across data tracks formed on said information storage disk;
    means including a head actuator motor for executing a track seek operation adapted normally to result in arrival of said head with zero velocity over the target track at the end of the seek;
    and means responsive to failure of the head to stop over the target track for generating and applying one or more braking current pulses to the head actuator motor, each pulse adapted to retard continued forward motion of the head to a predetermined non-zero fraction of the velocity of the head existing just prior to application of each of said pulses.

2. Track seek recovery system according to claim 1 in which the amplitude of said pulse is proportional to velocity of the head just prior to generation of said pulse.

3. Track seek recovery system according to claim 1 in which the amplitude of said pulse is determined by the equation:

$$I_{val} = \frac{0.707 \times MH \times TP}{0.5 \times IT^2 \times KF}$$

where:
    MH is the head mass, including any parts movable therewith; TP is the pitch between data tracks on the information storage disk; IT is a time interval between a pair of track crossing pulses detected just prior to generation of said breaking pulse and KF is a force constant of the actuator motor.

4. Track seek recovery system of claim 1 in which the duration of the braking pulse is proportional to velocity of the head just prior to generation of said pulse.

5. Track seek recovery system of claim 1 in which both amplitude and duration of the braking pulse is proportional to velocity of the head just prior to generation of said pulse.

6. Track seek recovery system of claim 1 in which the duration of the braking pulse is equal to about one-half the interval between a pair of track crossing pulses detected just prior to generation of said braking pulse.

7. Track seek recovery system for an information storage disk drive system adapted to move a head rapidly during a track seek operation to a target track at the end of the seek, the recovery system comprising:

means for generating track crossing signals as said head moves across data tracks formed on said information storage disk;

means including a head actuator motor for executing a track seek operation adapted normally to result in arrival of said head with zero velocity over the target track at the end of the seek;

means responsive to the track crossing signal generating means for a predetermined time period following the end of the track seek for detecting a predetermined number of track crossing pulses indicative of undesired, continued motion of said head past said target track;

and means responsive to said sensed continued motion for applying at least one braking pulse to said actuator motor adapted to slow the motion of said head by a predetermined amount.

8. Track seek recovery system of claim 7 in which there is further included means for iteratively generating successive ones of said braking current pulses; means operative between generation of each successive braking pulse for detecting whether a reversal in direction of movement of said head has occurred since generation of the previous braking pulse and means responsive to a detected reversal in direction of head movement to reverse polarity of the next succeeding braking pulse to effect retarding of the reversed motion of the head.

9. Head motion control system in a disk drive system for detecting failure of the head to stop over the target track of an information storage disk at the end of a track seek operation and for initiating corrective action to allow acquisition of control of the head by track following servo means, said motion control system comprising:

means for generating track crossing signal indicia as said head moves across data tracks formed on said information storage disk;

means operative following conclusion of a track seek operation for detecting a seek fail condition comprised of the occurrence of a predetermined number of said track crossing signal indicia within a predetermined time duration which is representative of an uncontrolled, continued motion of said head beyond the target track;

means responsive to said detected seek fail condition for initiating at least one head motion retarding effect adapted to slow the continued motion of said head across said data tracks by a predetermined amount;

means for sensing when said head motion has slowed to within a predetermined velocity range that permits effective initiation of said track following mode of operation;

and means responsive to said sensing means for initiating said track following mode when said head motion has slowed to within said velocity range.

10. A method of recovering from a failed track seek in an information storage disk drive system wherein the failure comprises continued, uncontrolled motion of the read/write head beyond the target track at the end of the seek operation, the method comprising:

generating track crossing signals as the head moves across data tracks formed on the information storage disk;

delaying for a first predetermined time period the initiation of track following servo control of the head after the conclusion of a track seek operation;

responding to the occurrence of a predetermined number of track crossing pulses during said first predetermined time period to initiate one or more braking current pulses of an amplitude and polarity adapted to retard the continued forward motion of the head by a predetermined amount;

and applying said braking current pulses iteratively to the actuator motor used to drive the head until the velocity of the head is low enough to allow acquisition of control of the head by the track following servo control.

11. The method of claim 10 wherein after the occurrence of a predetermined number of track crossing pulses during the first predetermined time period, a second predetermined time period is established during which the interval between ensuing track crossing pulses is used to determine if the velocity of the head movement is higher than that for which the track following servo can acquire control of the head.

12. The method of claim 11 wherein, during the second predetermined time period, the intervals between successive pairs of track crossing pulses are tested to determine the existing direction of head motion and the result of this test is used to determine the polarity of the braking pulse applied to the head actuator motor so as to effect retarding of the forward motion irrespective of the direction of head motion following the end of the track seek operation.

* * * * *